United States Patent
Mansfield et al.

[15] 3,705,462
[45] Dec. 12, 1972

[54] TEACHING MACHINE

[72] Inventors: Matthew Mansfield, 418 West 20th Street, New York, N.Y. 10011; Morton Cooperman, 55 West 92nd Street, New York, N.Y. 10025

[22] Filed: Aug. 13, 1971

[21] Appl. No.: 171,548

[52] U.S. Cl. .......................... 35/9 D, 35/6, 35/35 D
[51] Int. Cl. ........................................... G09b 7/02
[58] Field of Search ...................... 35/9 D, 35 D, 6

[56] References Cited

UNITED STATES PATENTS

| | | | |
|---|---|---|---|
| 2,505,230 | 4/1950 | Composto | 35/9 D X |
| 2,539,077 | 1/1951 | Hawkins | 35/9 D X |
| 2,586,710 | 2/1952 | Pick | 35/9 C |
| 2,720,038 | 10/1955 | Clark | 35/9 B |
| 2,853,799 | 9/1958 | Magnussen et al. | 35/9 D |
| 2,943,399 | 7/1960 | Davis | 35/9 B |
| 3,015,895 | 1/1962 | Stall | 35/9 D X |
| 3,122,844 | 3/1964 | Kharasch et al. | 35/9 B |
| 3,252,230 | 5/1966 | Doney | 35/9 D |

*Primary Examiner*—Wm. H. Grieb
*Attorney*—David S. Kane et al.

[57] ABSTRACT

A teaching machine is provided with a plurality of inserts, the first insert illustrating a question or problem and allowing for the depression of only certain selector keys. A second insert, aligned with the first insert, is provided with a plurality of openings which are acted upon by the selector keys, the openings in the second insert being connected by particular circuitry to allow for recognition by the operator of the teaching machine that an individual segment of the problem has been correctly selected and that the entire problem or question has been successfully completed. The machine may be so constituted, based upon an operator's selection, that only completion of a final answer is recognized.

15 Claims, 17 Drawing Figures

FIG. 1

INVENTORS.
MATTHEW MANSFIELD
MORTON COOPERMAN

INVENTORS.
MATTHEW MANSFIELD
MORTON COOPERMAN

INVENTORS
MATTHEW MANSFIELD
MORTON COOPERMAN

INVENTORS
MATTHEW MANSFIELD
MORTON COOPERMAN

TEACHING MACHINE

BACKGROUND OF THE INVENTION

A wide variety of apparatus have previously been developed in the teaching machine field. In general, these apparatus provide for a multiple choice answer, true-false answer, or matching question and answer. For example, a card for use on a particular teaching machine of the prior art might be for matching of states with capitals of the state and proper connection of the point illustrating or identifying the state and the point illustrating or identifying the capital would cause some type of signal to be actuated indicating a correct answer.

However, these prior art machines have not provided for a situation where a plurality of answers would have to be selected, the completion of each of the answers being required for the machine to indicate a totally complete answer. Further, none of the prior art machines have provided for a required sequence of answers in order to complete the total answer.

Examples of prior teaching machines employing electrical circuitry for selection and indication of an answer are U.S. Pat. Nos. 2,586,710 - Pick and U.S. Pat. No. 2,943,399 - Davis. In each of these patents a fixed circuit within the machine will connect two points. Cards having various questions and answers may be placed over the circuitry, but in each case the mating question and answer are in identical positions on the question card.

In U.S. Pat. No. 2,720,038 - Clark two circuits are provided, one for a correct answer and the other for an incorrect answer. Kharasch et al U.S. Pat. No. 3,122,844 includes a punchout placed below the answer on a curved key which extends through the card to complete an audio-visual signal.

In noe of these prior art machines, as previously indicated, is a system provided where a plurality of answers are required in order to complete a given question. In particular, none provide for a required sequential series of answers in order to complete a particular question. Additionally, as noted, these prior art patents generally include only a single circuit such that the user of the machine can soon determine the position of the correct answer, even if he does not otherwise know the answer.

SUMMARY OF THE INVENTION

In accordance with the present invention a teaching machine has been developed wherein knowledge of the position of the answer is no aid in determining the correct answer. Further, a plurality of keys are depressed in order to complete the answer to a particular question and the circuitry of the machine may be so arranged that the portions of the answer must be given in a particular sequence in order to complete actuation of a signal to indicate the correct answer. Further, the teaching machine of the present invention is so formed that even if there should be a manner of determining the particular circuit connections, other circuit boards may be easily employed.

The teaching machine of the present invention includes four essential components and an optional fifth component. The essential components include, first, a case which includes a viewing window and a keyboard along with receptacles or supports for the remainder of the components. A circuit board is adapted to be mounted within this case, the circuit board allowing for depression of only certain of the keys present on the keyboard of the case or, particularly when the optional component is in place, for depression of any of the keys. Placed above the circuit board, but within the case, is a second board or sheet which includes an illustration or representation of the question to be answered and cutouts which correspond both to the keys on the keyboard and to the openings in the circuit board. A further component, employed in conjunction with a particular circuit board and, more particularly, in conjunction with a particular question board or sheet, is an overlay sheet to be placed on the outside of the casing, over the massed keys. This overlay sheet identifies the answer given by depression of any particular key as, for example, a letter, number, word, illustration, etc. With the system just described, one or more questions and corresponding answers may be presented and given, a circuit being completed and a signal being given upon completion of the correct answer.

If desired, the teaching machine case may be provided, internally, with an additional, optional structure. This additional structure is a grid like frame which fits below the viewing window on the case and is provided, in each of the openings, with an indicator, such as a light bulb. The grid-like frame does not completely cover the window opening of the casing, some space being provided for viewing of the question and for an indication of completion of the total answer. The indicators and the grid-like frame are provided to indicate the completion of each portion of the answer and the question boards or cards employed when this grid-like frame is used are provided with portions of the answer to correspond with each of the openings in the grid-like frame. Thus, a teaching machine is provided with a plurality of modes of operation and a plurality of parts which interconnect to provide an overall teaching function.

DESCRIPTION OF tHE PREFERRED EMBODIMENTS

Figure 1:
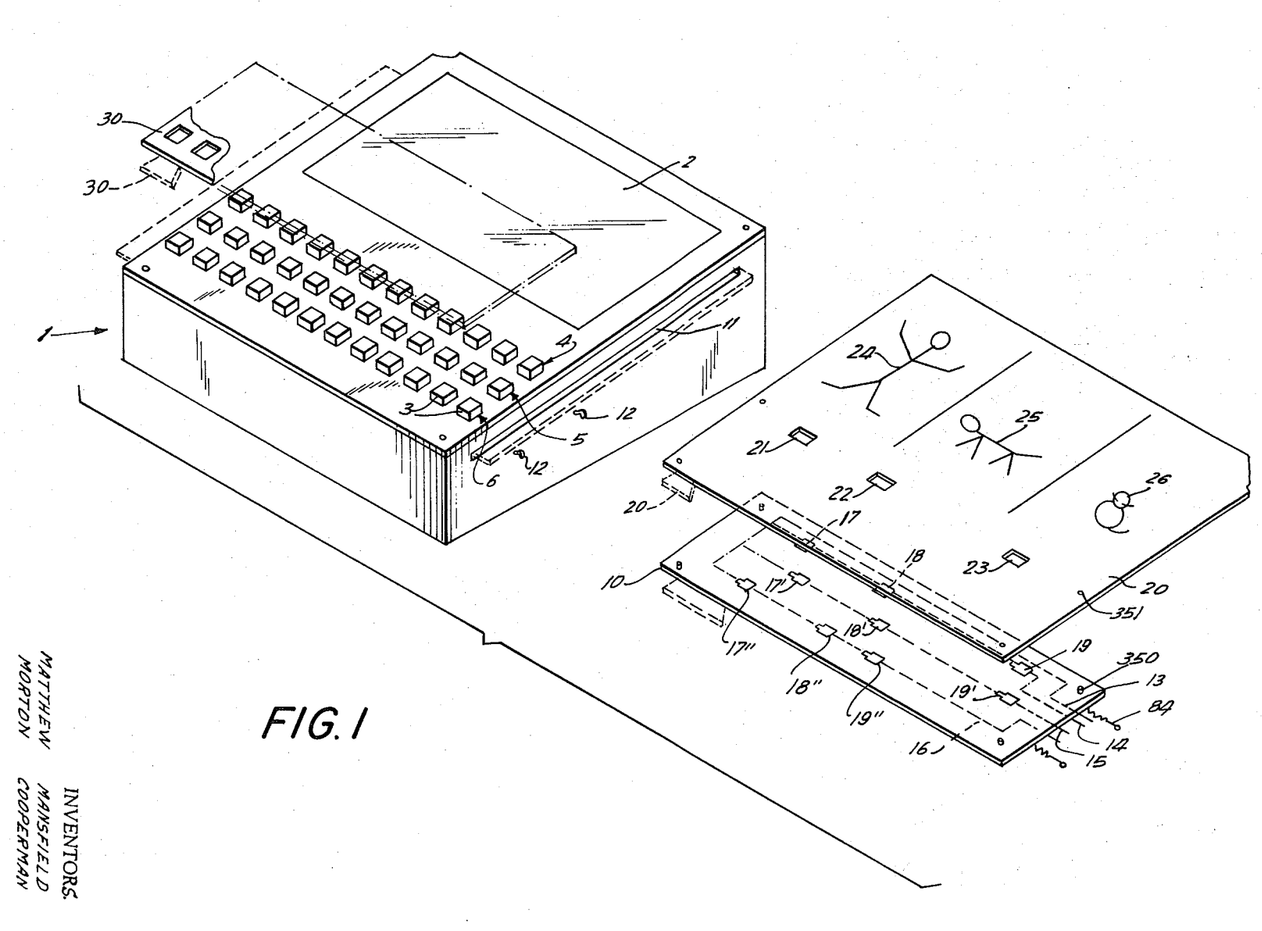
FIG. 1 is a perspective assembly view of a teaching machine according to one embodiment of the present invention.
Figure 2:
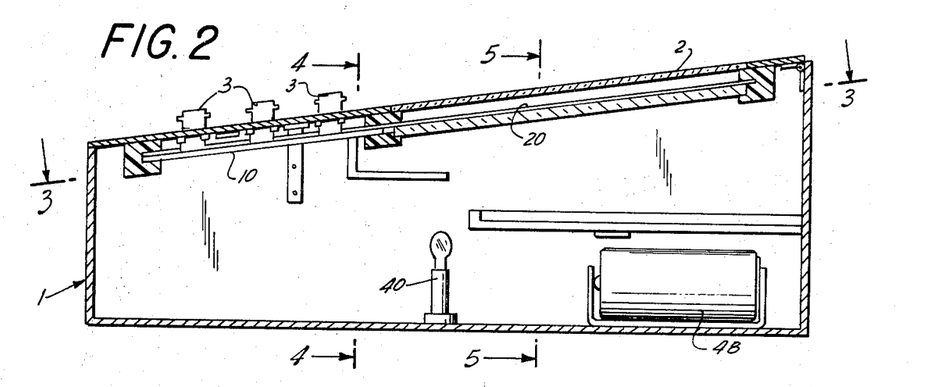
FIG. 2 is a transverse vertical section of the casing of the teaching machine illustrated in FIG. 1.

Referring to the figures, FIG. 1 shows a perspective, assembly view of a teaching machine according to a first embodiment of the present invention, where the machine includes a case 1 having a viewing window 2 and a plurality of depressible selector keys 3. A spring-loaded circuit board 10 is inserted into slot 11 formed on the casing and is movably held within the slot by spring members 84 held to clips 12 formed on the side of the case adjacent slot 11. A question board or sheet 20 is inserted into the machine through the same slot so as to overlie the circuit board 10. An overlay sheet 30 is placed on the top of the casing, the overlay sheet being provided with openings to accommodate each of the depressible selector keys 3.

The circuit board 10 is provided with a central power source line 13 and three individual circuits 14, 15 and 16. It is also provided with a series of openings in each of these individual circuits 14, 15 and 16 such as the openings 17, 18 and 19 in circuit 14, openings 17', 18' and 19' in circuit 15, and openings 17'', 18'' and 19'' in circuit 16. The openings 17, 18 and 19 in circuit 14 correspond with openings 21, 22 and 23 in the problem board or card 20.

The problem board 20 of FIG. 1 is illustrated as one for spelling with three figures, the first of a boy 24, the second of a dog 25, and the third of a cat 26. The overlay sheet 30 will be provided with a plurality of letters, at least the letters B, O and Y appearing in line 4 of keys 3, these three letters appearing over keys corresponding to openings 21, 22 and 23 in problem card 20 and openings 17, 18 and 19 in circuit 14. Thus, on depression of the three correct keys circuit 13 will be completed from power line 13 and an indicator such as signal light 40, connected from power source 48 through main power line 13 and circuit 14 is lit to illustrate the correct answer. If desired, the letters B, O and Y may appear directly below FIG. 24 to show that the proper answers were selected.

In a similar manner, the letters on overlay sheet 30 appearing directly over the second line 5 of selector keys on case 1 will have at least the letters D, O and G. These letters will appear directly over the keys which align with openings 17', 18' and 19' in circuit 15 and with corresponding openings which are formed in problem card 20. Further, letters will be printed on overlay card 30 overlying the third row 6 of selector keys on the circuit board and at least the letters C, A and T will appear, the positions of these letters corresponding to openings 17'', 18'' and 19'' on circuit board 10 and with corresponding openings which will appear on problem card 20.

Depression of the three keys which correspond to the correct answer will result in completion of the particular circuit and illumination of a particular signal light.

Figure 3:
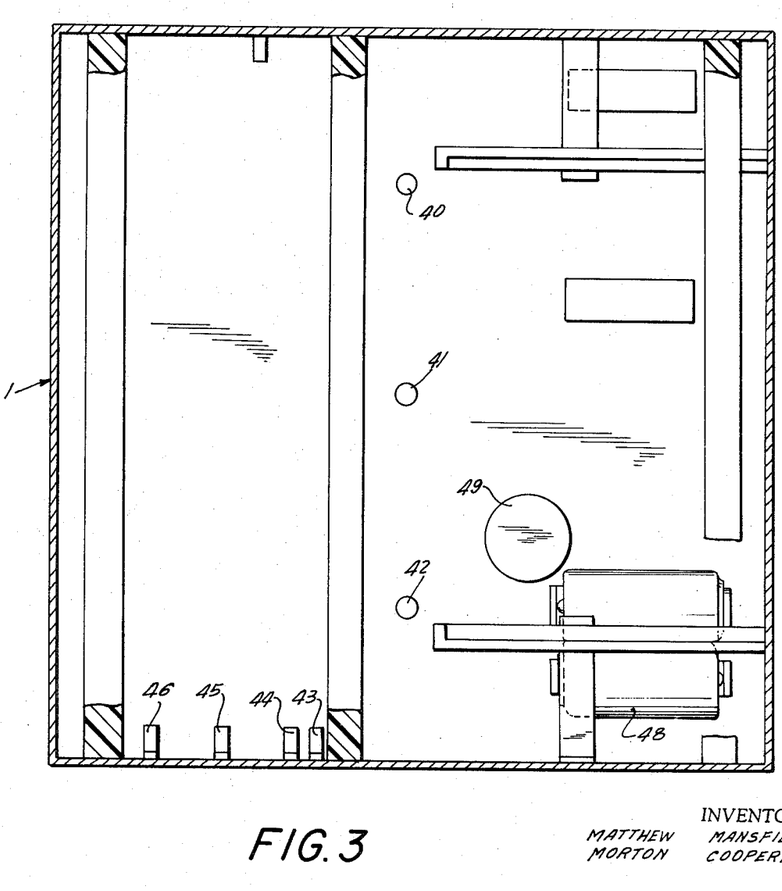
FIG. 3 is a view along the line 3—3 of FIG. 2.

As can be seen in FIG. 3, three signal lights are provided, light 40 to correspond to FIG. 24, light 41 to correspond with FIG. 25, and light 42 to correspond with FIG. 26. While three separate signal lights have been illustrated, it will, of course, be appreciated that a single signal light can be employed. Also shown in FIG. 3 are contacts 43, 44, 45 and 46. These contacts are provided so as to mate with the central power line 13 and circuits 14, 15 and 16 on circuit board 10. While the full wiring of these items is not shown, the proper connections from the terminals 43 through 46 to the power source 48 and the signal lights 40, 41 and 42 will be apparent. Additionally, if desired, a buzzer 49 may be provided, the buzzer also being actuated upon completion of a circuit by depression of the proper keys to give the required answer.

Figure 4:
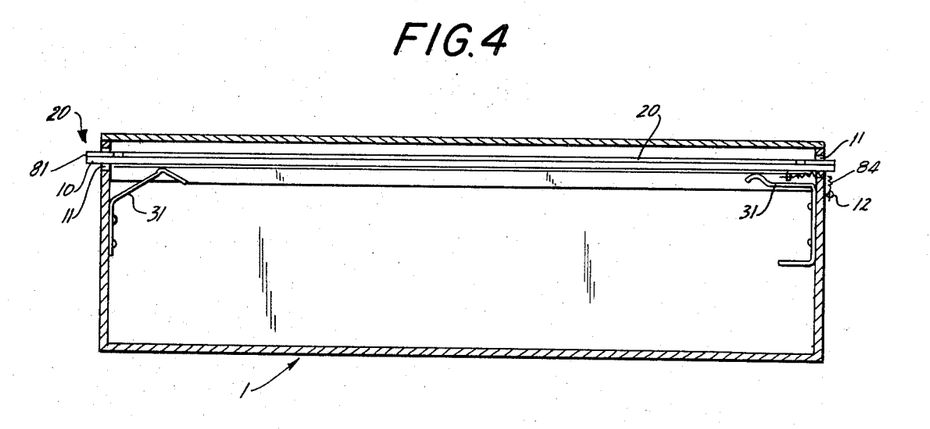
FIG. 4 is a view along the line 4—4 of FIG. 2.
Figure 5:
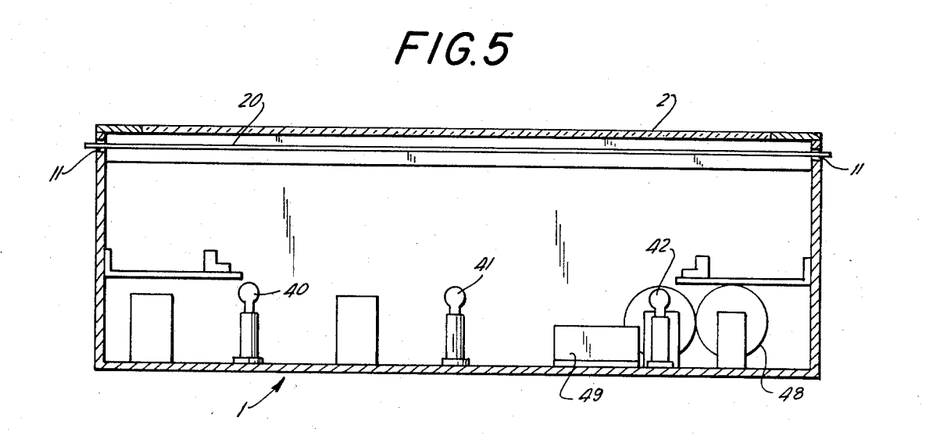
FIG. 5 is a view along the line 5—5 of FIG. 2.

While the power source 48 is illustrated as a pair of dry cell batteries, it will be apparent that standard electric current can be employed to supply the necessary power to the device. The teaching machine in assembled form is illustrated in FIG. 4 with the circuit board 10 having the problem card 20 overlying it. The board and card are urged against the upper portion of slot 11 by spring clips 31. Springs 84 attached to the circuit board and held on hooks 12 are also illustrated.

A particularly desirable selector key for use in the present invention is illustrated in FIGS. 6 through 10. The key includes a main body member 60 seated within the upper portion of case 1. Overlying this upper portion of the case and surrounding the key body is overlay sheet 30. Directly below the top of case 1 is circuit board 10 with an opening such as 17 illustrated. Formed on the key body are shoulders 61 which are employed to limit the extent to which the key can be depressed.

Figure 6:
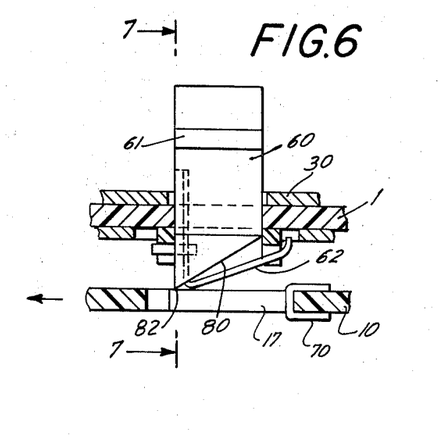
FIG. 6 is an enlarged, fragmentary sectional view of a selector key employed in the teaching machine of the present invention.
Figure 8:
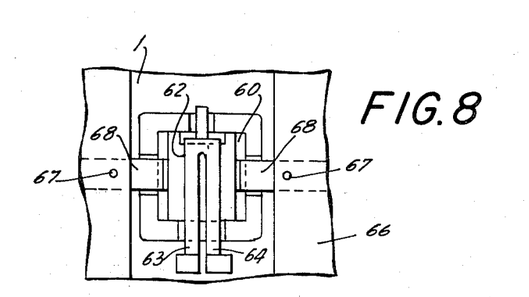
FIG. 8 is a view along the line 8—8 of FIG. 7.

Mounted to the key body 60 is an electrical contact member 62 as illustrated, particularly, in FIG. 8. For best contact this member 62 may be bifurcated having contact blades 63 and 64. As illustrated in FIG. 6, contact member 62 is molded into the key, though other joining means may be employed.

Formed on the underside of the top of case 1 is a retaining member 65 which acts to hold a rubber or plastic sheet 66 against the bottom of case 1. The retaining member 65 may be held in place by any suitable means such as rivets 67. Surrounding each opening through which a key is fitted are rubber restraining means 68 which act against the narrowed portion 69 of key body 60.

Figures 7, 10:
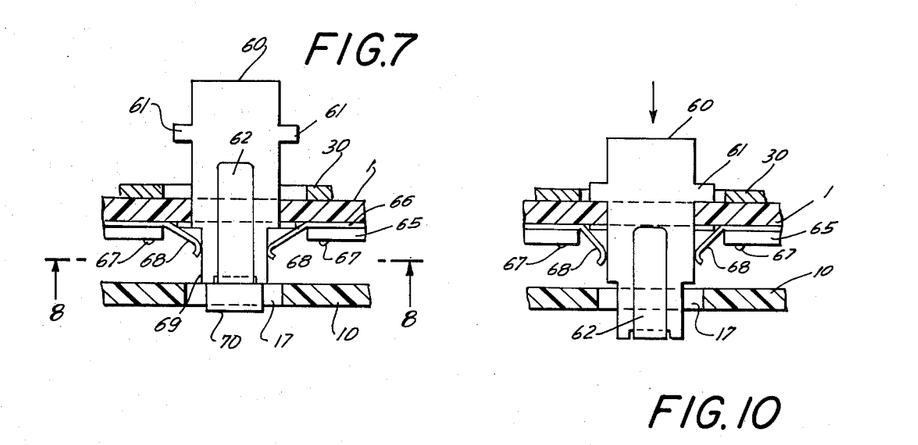
FIG. 7 is a view along the line 7—7 of FIG. 6.
FIG. 10 is a view along the line 10—10 of FIg. 9.
Figure 9:
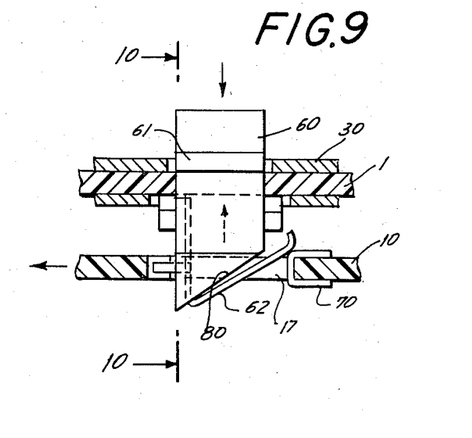
FIG. 9 is a view similar to FIG. 6 showing the selector key in depressed position making contact with the circuit board employed according to the present invention.

When the key is depressed, as illustrated in FIGS. 9 and 10, downward motion is limited by abutment of shoulders 61 against the top of case 1. The restraining wings 68 yield and allow the widened portion of body 60 to pass. When the key has travelled to the limit determined by shoulders 61, contact means 62 lies adjacent a corresponding contact means 70 formed on the circuit board 10. In this manner, a portion of the circuit is completed. When the keys corresponding to openings 18 and 19 have been similarly depressed, circuit 14 is completed.

Key 60 is also provided with a sloping surface 80. The purpose of this sloping surface is to allow for the key to be moved to its upright position upon completion of a problem. This is accomplished by pulling extending portion 81 of circuit board 10 to the left, as seen in FIGS. 1 and 4. In this manner, contact 70 rides against electrical contact 62 and sloping surface 80. This inclined plane action forces key 60 upwardly against the restraining action of members 68 until the key is moved to its uppermost position at which point the surface of circuit board 10 contacts the lowermost tip 82 of key 60. When circuit board 10 is released, it is returned to its normal position by action of tension springs 84. The teaching machine is then available for additional problems.

A second embodiment of the invention is illustrated in FIGS. 11 through 17. The portions of the second embodiment which correspond to those of the first embodiment are indicated by adding 100 to the identifying numerals of the first embodiment. Thus, the second embodiment includes a case 101 having a viewing window 102 and a plurality of massed, depressible selector keys 103. A circuit board 110 is inserted into the machine through slot 111 and a problem board or card 120 overlies the circuit board. An overlay sheet 130 is also provided to cover the massed, depressible, selector keys. Hooks 112 are provided adjacent slot 111 to retain springs 184 on circuit board 110. In the case of circuit board 110, openings 117 are provided for each of the depressible selector keys 103. As with problem card 20, problem card 120 is provided with openings 121, 122 and 123 which correspond with the depressible keys 103 which constitute the correct answers to the problem posed.

Figure 11:
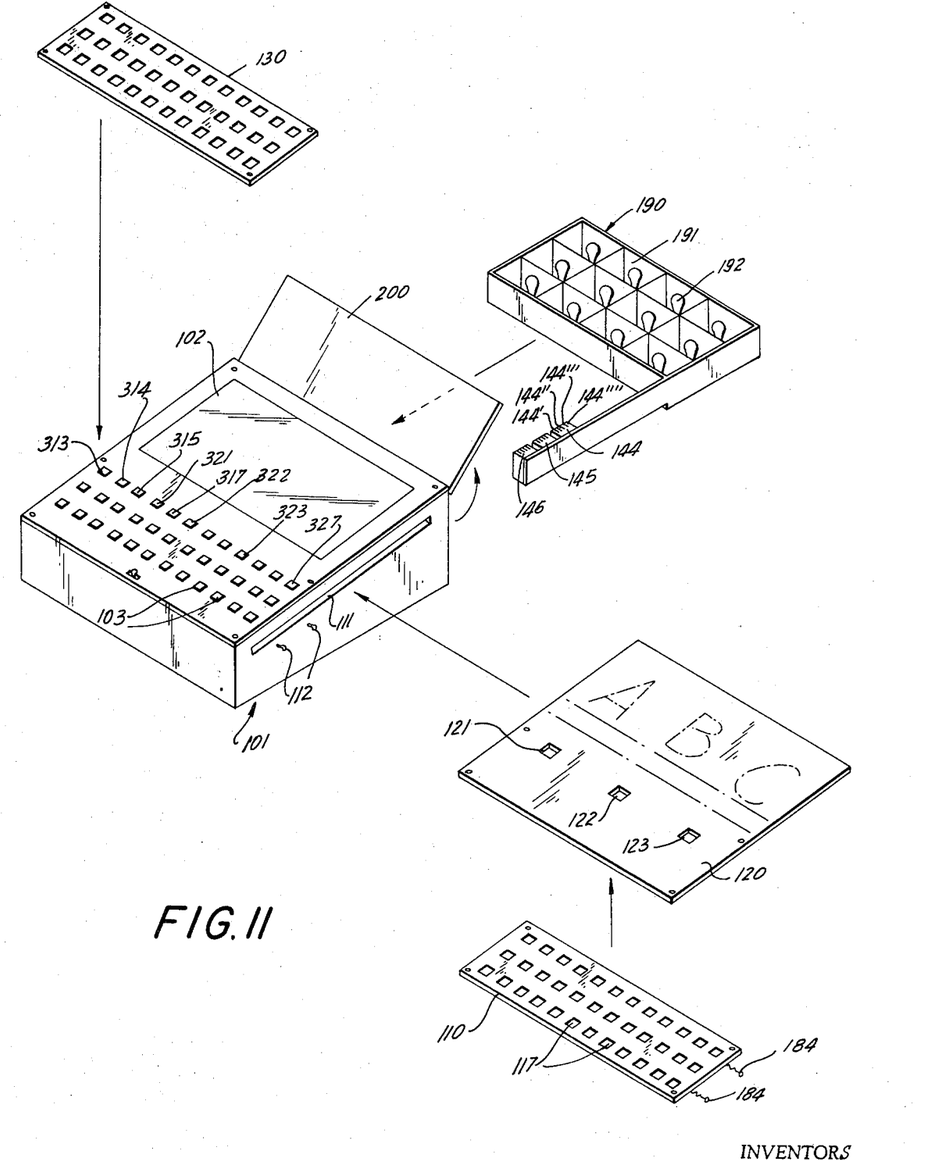
FIG. 11 is a perspective assembly view of a second embodiment according to the present invention.
Figure 12:
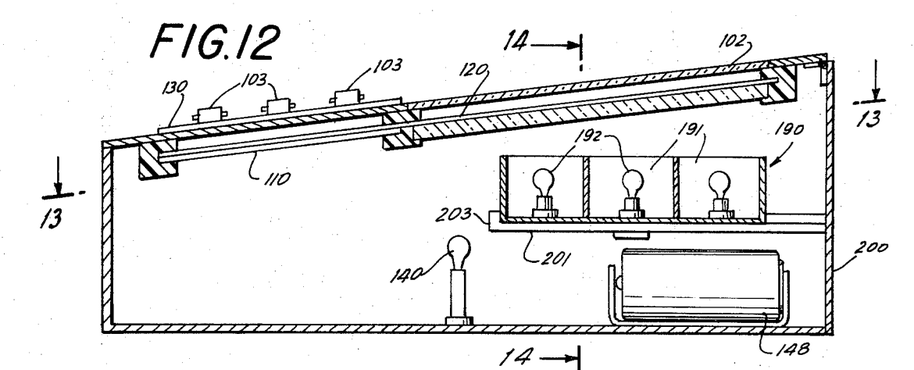
FIG. 12 is a transverse vertical section of the machine according to FIG. 11.
Figure 13:
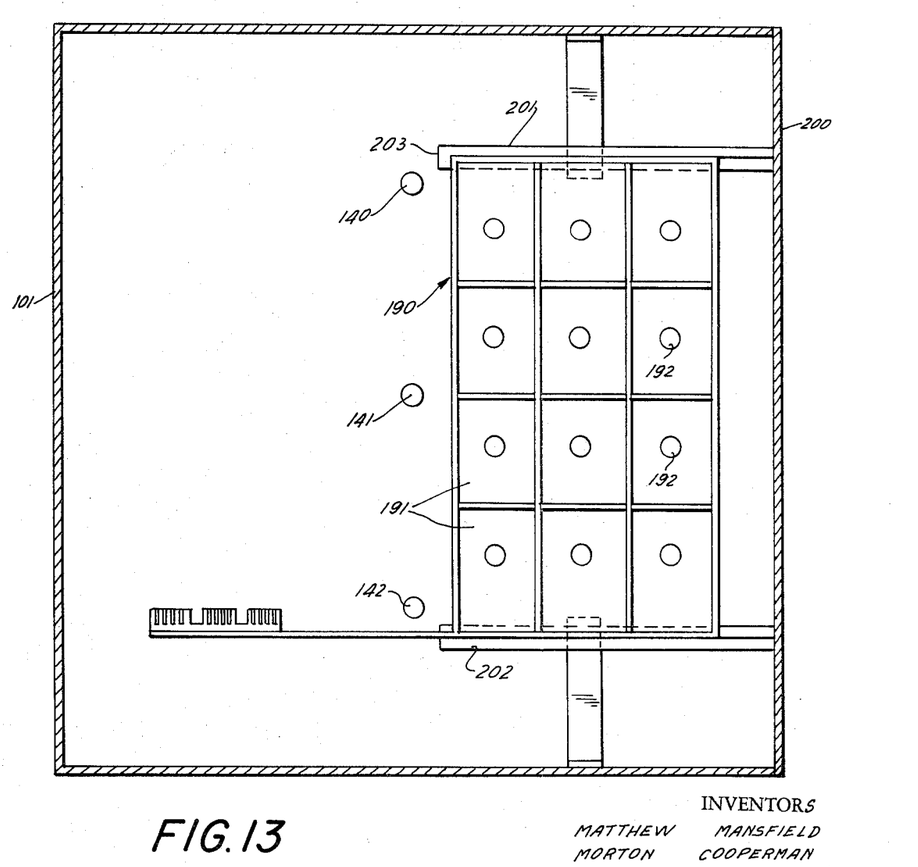
FIG. 13 is a view along the line 13—13 of FIG. 12.
Figure 14:
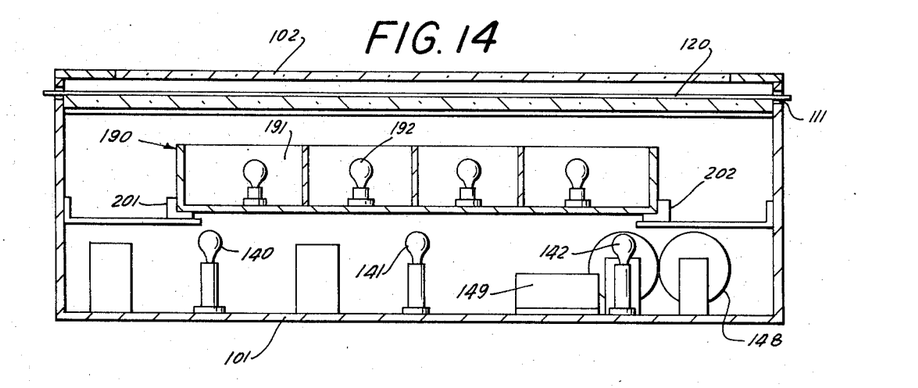
FIG. 14 is a view along the line 14—14 of FIG. 12.
Figure 15:
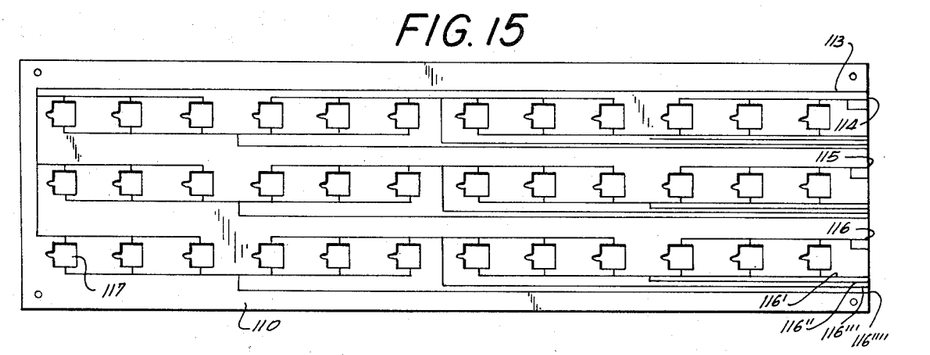
FIG. 15 is an illustration of one side of the circuit board employed in the second embodiment.

An additional part, grid-like frame 190, is provided in the second embodiment. This grid-like frame includes a plurality of openings 191, twelve in number as illustrated in FIG. 11. Each of these openings is provided with a signal light 192 to indicate correct completion of a portion of the answer. Contacts 144, 145 and 146 are provided as a portion of the grid-like frame 190. These contacts 144-146 mate with circuitry on the special circuit board 110 provided for use with the grid-like frame 190. As will be noted from FIG. 11, each of the contacts is provided with four sub-contacts, as 144', 144'', 144''' and 144''''.

The grid-like frame 190 is inserted into the case 102 by opening door 200 formed in the rear of case 101 and sliding in the grid-like frame 190. The frame 190 rests on slides 201 and 202 which are provided with stops as illustrated at 203 to correctly position the frame 190 within the case 101. Internally, the case employed in this embodiment is essentially the same as the case employed for the first embodiment and includes a power source 148 and individual circuit signal lights 140, 141 and 142. In general, the operation of these devices is the same as that in the first embodiment illustrated in FIGS. 1 through 5. In fact, the same case can be employed.

Figure 16:
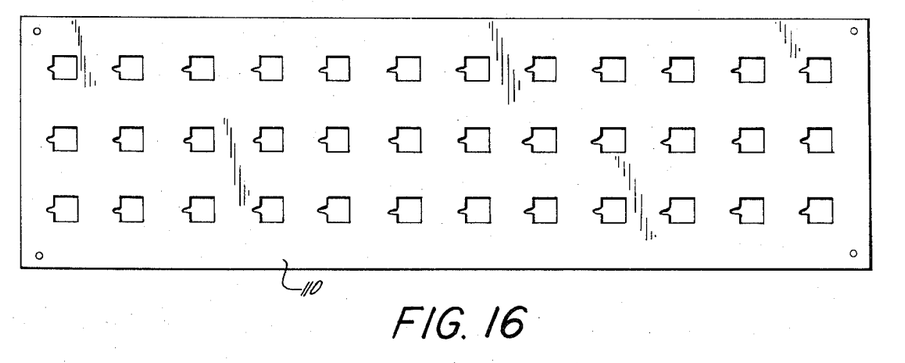
FIG. 16 is a view of the opposite side of the circuit board of FIG. 15.

As previously indicated, the circuit board 110 for use in accordance with this embodiment is different from the circuit board 10 employed according to the first embodiment. A major distinction is the fact that an opening 117 is provided to correspond with each of the depressible selector keys 103. Secondly, the openings in this circuit board are connected in a different manner from circuit board 10. Again, three circuits are provided starting from a common power source 113. The first circuit terminates at 114, the second at 115, and the last at 116, and these mate with contacts 43, 44, 45 and 46 as illustrated in FIG. 3. In addition, four additional lines are provided on each circuit as shown, for example, by 116' through 116''''. These four additional lines from each of the groups of circuits connect with contacts 144, 145 and 146 formed as a portion of the grid-like frame as illustrated in FIG. 11. These additional circuits are for the purpose of illuminating the individual signal lights 192 as will be described in additional detail below. The reverse side of circuit board 110, as seen in FIG. 16, has no additional circuitry. The keys employed and their manner of operation are the same as in the first embodiment as illustrated in FIGS. 6 through 10.

Figure 17:
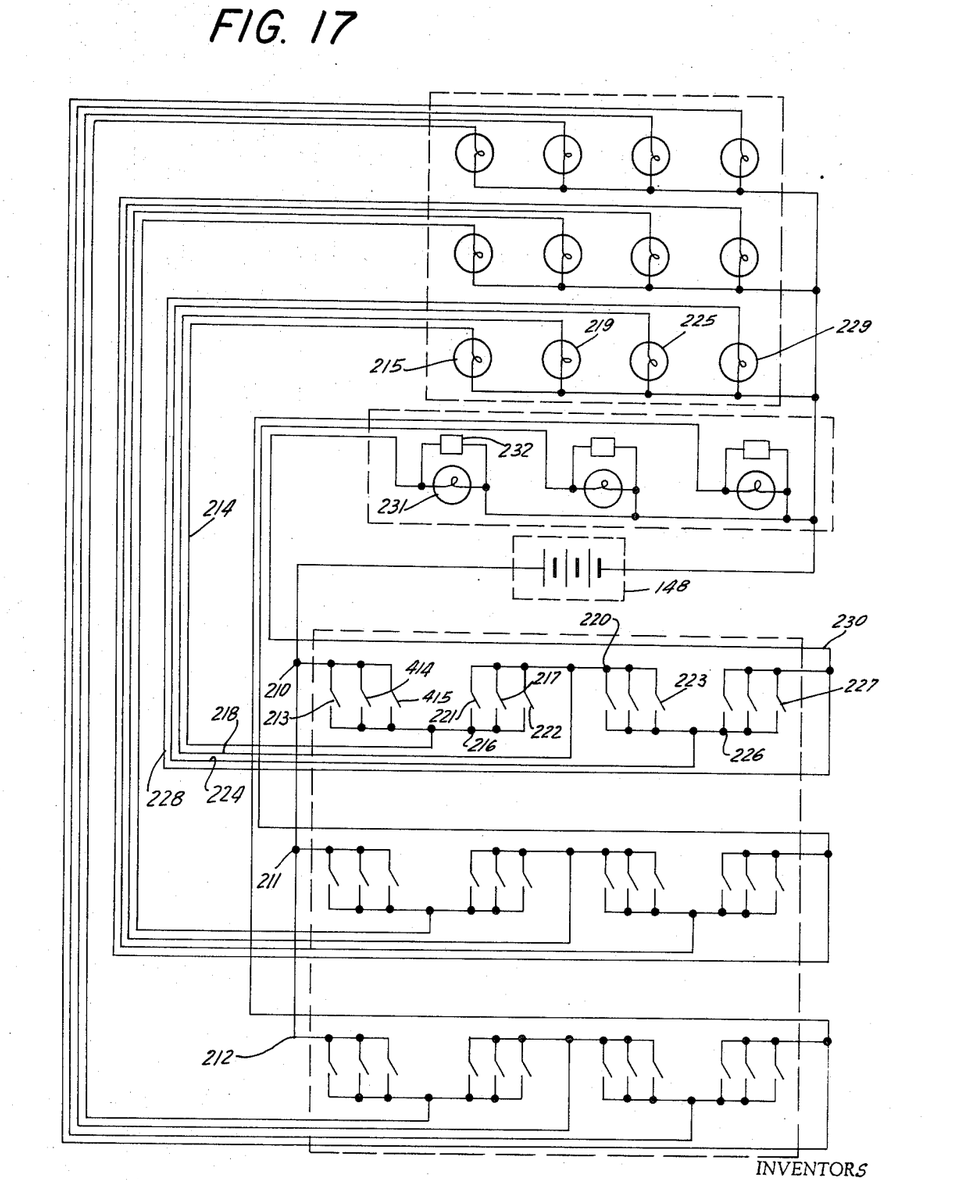
FIG. 17 is a circuit diagram of the teaching machine according to the second embodiment including the circuit board, power source, and grid-like frame including indicator lights.

The circuitry employed according to the second embodiment can best be seen by a review of FIG. 17. The power source 148 is connected to each of three individual circuits as at 210, 211 and 212. Depression of a selector key 103, for example that in the upper left-hand corner of the massed selector keys closes a circuit at 213. This completes a circuit through line 214 so as to illuminate indicator light 215, corresponding to one of indicator lights 192. Circuit 213 is obviously one which corresponds to the first step of the correct answer to the problem. On the particular problem card, an opening will be left corresponding to the key in the upper left-hand corner 313, so as to allow depression of that key and completion of circuit 213, but no openings will be left for keys 314 and 315, so that these may not be depressed and circuits 414 and 415 cannot be completed. Completion of the circuit at 213 also allows for partial completion of the full circuit to point 216. Depression of a selector key 317 completes a circuit at 217 and thus, through line 218 to indicator light 219, also found in the grid-like frame 190. At the same time, the circuit is partially completed to point 220. Again, an opening is left in the problem card 120 to allow for depression of key 317, but not of keys 321 and 322, so that circuits 221 and 222 are not completed. Similarly, depression of a key such as 323 completes a circuit at 223, and through line 224 illuminates indicator light 225. Again, the partial circuit is completed to point 226.

Depression of a key such as 327 completes circuit 227, through line 228, to indicator light 229. Thus, each of the indicator lights for the facets of the particular problem circuit are illuminated. Completion of circuit 227 also completes a circuit through line 230 which connects to signal light 231, corresponding to light 140, indicating the completion of the full problem. This signal light may be wired in parallel with an audible signal such as a buzzer 232.

It will be apparent that circuits beginning at points 211 and 212 will operate in a manner similar to that just described in detail with regard to the circuit initiated at point 210. Depression of a single key from a gang of three keys will illuminate one of the signal lights 192 in the grid-like frame 190 and at the same time will complete a partial full circuit to the next set of three keys. When one key from each of the four illustrated sets has been depressed the full circuit is completed to the problem signal light 140, 141 or 142. As previously indicated, an audio signal may be placed in parallel with the full problem indicator lights.

In operation, and turning to the first embodiment, a selector key 3 is depressed in the upper row 4 of selector keys. Only three keys, as illustrated, can be depressed, as only those openings are formed in the circuit board 10 and problem card 20. Depression of the keys completes a circuit in the circuit board as illustrated in FIGS. 9 and 10, and when each of the three keys corresponding to openings 17, 18 and 19 and 21, 22 and 23 have been depressed, circuit 14 is completed. Completion of this circuit causes illumination of signal light 40 and, if an audio signal is also contained in the device, actuation of that signal. When this problem has been completed, the circuit board 10 is moved to the left so as to return the selector keys 3 to their initial position and disconnect circuit 14. The operator of the teaching machine can then proceed with answering the second question using row 5 of selector keys in the same manner. Again, when circuit 15 is completed, signal light 141 is illuminated and an audio signal may be actuated. The circuit board is again moved to the left to disconnect the keys and break the circuit and springs 84 cause the circuit board to return to its initial position. The operator can then complete the third problem using the third row of keys 6, completing circuit 16 and illuminating signal light 142. At this time the problem card 20 is removed and replaced with a similar card having additional problems. If desired, a different circuit board can also be employed and the board is easily disconnected by removing springs 84 from hooks 12 and replacing the board with a similar board.

In order to maintain proper alignment of problem card 20 and circuit board 10 pins 350 are provided on the upper surface of the circuit board mating with openings 351 formed in the problem card. It will be apparent that different circuit boards can have different locations of pins 350 so as to assure that only the proper problem cards, i.e., those with mating openings 351 are used. While the first embodiment has been illustrated with three openings in each of rows 4, 5 and 6, it will be apparent that any number of openings can be employed and, in fact, up to the total number of keys formed on the case in that row.

Operation of the device according to the second embodiment is essentially the same. A circuit board 110 and a problem card 120 are placed in the case 1 along with the grid-like frame 190. In this case, openings are provided in the circuit board 110 for each of the keys formed on the case, but openings are formed in the problem card only for the proper keys. Depression of a proper key causes illumination of one of the signal lights in the grid-like frame and a partial completion of the circuit for the entire problem. Depression of four keys in the first row completes the full problem circuit and causes illumination of the signal light for that circuit and, if an audio signaller is present actuation of the audio signaller. Again, when the first problem is completed, the circuit board 110 is moved to the left in the same manner as the circuit board 10 and is returned to its initial position by springs 184. This causes upward movement of those keys which have been depressed and disconnection of the particular circuit. A second problem can then be worked out on the device employing the second row of keys in the same manner and a third problem with the third row of keys. While four sets of keys have been illustrated for each row, it will be apparent that by a minor modification of the circuit board, two, three, five or six sets of answers can be required for completion of a particular problem.

The problem cards provided for either of the embodiments can have printing on both sides. Printing must be facing upwardly so as to be viewable through viewing window 2 or 102 to designate the problem. However, printing can also be placed on the reverse side of the generally translucent problem card and that printing will be invisible until a signal light is illuminated. Thus, in the first embodiment, the answer BOY will not be visible until signal light 140 is illuminated, because of printing on the reverse side, while the picture of the boy will be visible at all times in order to illustrate the problem to be solved. Similarly, the problem will be visible because of printing on the top of problem card 120, while the individual answers will be printed on the reverse side to be visible only when a signal light 192 is illuminated and the full problem solution, if desired, when the signal light 140 is illuminated.

With the second embodiment, as with the first, it will be apparent that a plurality of circuit boards and problem cards can be used. It will also be necessary, with each of the embodiments, to provide different overlay cards. The different overlay cards can be used to vary the positions of particular letters or to allow solution of different types of problems. For example, a first overlay card for a particular set of problem cards might be provided with letters. A second overlay card, corresponding to a different set of problem cards, would be provided with numbers, while a third overlay card, corresponding to yet another set of problem cards, could be provided with words, places, figures, etc.

A teaching machine with general applicability to a wide variety of problem solving techniques has thus been described. The machine may be employed for more elementary teaching functions, such as spelling or simple addition or, by a modification of the overlay sheet and problem cards, can be employed for geometrical theorems, algebraic problems, etc. A conservation of parts is obtained by placing a plurality of problems on each problem card and, if desired, the machine may be employed in such a way that an answer must be given in the correct sequence in order to complete the necessary circuitry to illustrate the proper answer. This is particularly true in the case of the second embodiment illustrated where depression of a given key indicates completion of that segment of the problem and at the same time only partially completes a circuit for the full answer.

The invention should not be limited to the particular embodiments shown and described, but only as covered in the appended claims.

I claim:
1. A teaching machine comprising:
 a. a case with a viewing screen and a plurality of depressible selector keys;
 b. a circuit board for mounting within said case, below said keys, and having openings to accommodate at least some of said keys on depression, said openings providing interruptions in an electrical circuit;
 c. a problem card for mounting in said case, over said circuit board and below said keys and having a plurality of openings corresponding to at least some of said keys to accommodate said keys on depression, and a problem illustration below said viewing screen;

d. a power source within said case connected to said circuit board; and e. at least one visual or audio signal within said case, said signal being connected to said circuit board and said power source and being actuated by depression of proper keys to complete a circuit through said circuit board.

2. The teaching machine of claim 1 wherein the openings in said problem card and the openings in said circuit board correspond only to the proper keys to be depressed.

3. The teaching machine of claim 1 wherein said circuit board is provided with a plurality of circuits and said problem card has a plurality of problems corresponding to each of said circuits, openings in said problem card for said depressible keys being provided for each of said problems.

4. The teaching machine of claim 1 wherein said circuit board is movable, against the action of retaining springs, so as to return said selector keys to their original position.

5. The teaching machine of claim 1 wherein alignment means are provided to retain the alignment of said circuit board and said problem card.

6. The teaching machine of claim 1 wherein the problem is printed on the upper surface of said problem card, viewable through said viewing screen, and the answer is printed on the lower surface of said problem card, viewable through said viewing screen, only upon illumination of a signal light.

7. The teaching machine of claim 1 having, in addition, an overlay card for placement on top of said case, surrounding each said depressible key, to identify the answer being given by depression of said key.

8. A teaching machine including:
a. a case having a plurality of depressible keys and a viewing screen;
b. a circuit board for mounting within said case and below said depressible keys, an opening in said circuit board being provided for each of said keys;
c. a problem card for mounting within said case, above said circuit board and beneath said keys, said problem card having openings only for those depressible keys which will provide the desired answer;
d. a grid-like frame for insertion within said case, said frame being provided with a plurality of indicator lights placed below said viewing screen; and
e. a power source within said case connected to said circuit board and said frame whereby depression of a proper key will cause illumination of said indicator lights.

9. The teaching machine of claim 8 wherein said circuit board is provided with a plurality of circuits and said problem card has a plurality of problems corresponding to each to each of said circuits, openings in said problem card for said depressible keys being provided for each of said problems.

10. The teaching machine of claim 8 wherein said circuit board is movable, against the action of retaining springs, so as to return said selector keys to their original position.

11. The teaching machine of claim 8 wherein alignment means are provided to retain the alignment of said circuit board and said problem card.

12. The teaching machine of claim 8 wherein the problem is printed on the upper surface of said problem card, viewable through said viewing screen, and the answer is printed on the lower surface of said problem card, viewable through said viewing screen, only upon illumination of a signal light.

13. The teaching machine of claim 8 having, in addition, an overlay card for placement on top of said case, surrounding each said depressible key, to identify the answer being given by depression of said key.

14. The teaching machine of claim 8 having a second indicator light, connected to said circuit board and said power source, said second indicator light being illuminated upon depression of a plurality of keys constituting an answer to an entire problem.

15. The teaching machine of claim 3 wherein the circuitry of the circuit board provides for illumination of a frame indicator light on depression of any one of a plurality of keys.

* * * * *